United States Patent [19]

Ladouceur

[11] Patent Number: 4,462,529
[45] Date of Patent: Jul. 31, 1984

[54] LINEAR ACCELERATOR SYSTEM FOR AXIALLY ADVANCING AN ELONGATE WORKPIECE

[75] Inventor: Harold A. Ladouceur, Livonia, Mich.
[73] Assignee: Alpha Industries, Inc., Novi, Mich.
[21] Appl. No.: 323,785
[22] Filed: Nov. 23, 1981
[51] Int. Cl.³ .................. B65H 17/26; B65G 15/44
[52] U.S. Cl. .................................. 226/125; 226/94; 198/619
[58] Field of Search ............... 226/123, 125, 135, 136, 226/137, 138, 94, 8; 83/401, 360, 363, 367; 336/61; 198/619, 691; 209/127 R-130

[56] References Cited

U.S. PATENT DOCUMENTS

| | | | |
|---|---|---|---|
| 1,441,250 | 1/1923 | Smith | 81/57.37 X |
| 2,633,625 | 4/1953 | Romans et al. | 226/125 |
| 3,616,978 | 11/1971 | Haslam | 226/93 |
| 3,965,378 | 6/1976 | Liebe et al. | 310/65 |

*Primary Examiner*—Leonard D. Christian
*Attorney, Agent, or Firm*—Krass & Young

[57] ABSTRACT

A linear accelerator system for linearly advancing an electrically conductive, elongate workpiece, such as tubing, along its longitudinal axis toward a cutoff station or the like includes a helically configured electrical coils concentrically disposed around the workpiece for inducing an electromagnetic field which imposes an axial force on the workpiece. An adjustable stop assembly engages one end of the workpiece to allow selection of the length to be cut. A switch operated by the stop assembly produces a first control signal for controlling a relay which deenergizes the coil; the relay reenergizes the coil in response to a second control signal produced by another switch which senses the completion of the cutoff operation. Sleeves removably mounted on the coil to accommodate workpieces having various diameters. In lieu of the stop assembly, a length encoder may be optionally employed in combination with the accelerator or a separate retarding device to control feed length.

10 Claims, 6 Drawing Figures

LINEAR ACCELERATOR SYSTEM FOR AXIALLY ADVANCING AN ELONGATE WORKPIECE

TECHNICAL FIELD

The present invention broadly relates to accelerators for linearly advancing an elongate workpiece, and deals more particularly with an accelerator system for feeding preselected lengths of electrically conductive tubing to a cutoff apparatus which severs successive lengths of the tubing.

BACKGROUND ART

Various types of accelerators are commonly used in industrial applications for advancing a workpiece toward or away from an operating station. For example, in connection with tube severing operations in which successive sections of a length of tubing are cut to a desired size, the tubing is axially fed toward a tube cutoff machine which typically includes a press-operated cutting unit. The cutting unit includes a pair of jaws which grip the tube and a knife which severs the clamped tubing. A mechanical accelerator is normally provided to feed the tubing toward the dieset.

Prior art tube feeding accelerator mechanisms consist of a number of movable mechanical parts, such as mechanically driven rollers which engage the sides of the tubing however, this approach is undesirable for several reasons. Jamming sometimes occurs when the feed-end of the tubing engages the face of the rollers at an angle which is too severe. Also, it is not uncommon for the rollers to impart skid marks or mars on the tubing. Perhaps more importantly, these previous mechanisms are relatively complex, and therefore costly in their construction and require periodic replacement of various component parts, such as the tube engaging rollers, which are subject to rapid wear.

Another problem associated with prior art accelerator systems, and particularly those employing tube-engaging rollers is that of poor repeatability of cutting length. Normally, prior art systems employ a mechanical stop for engaging the end of the tubing after the desired length thereof has been fed through the cutoff station. If the rollers are disengaged from the tubing prematurely, the end of the tubing does not reach the stop, in which case the severed section is too short. On the other hand, if the tubing is fed too quickly it sometimes rebounds after engaging the stop thus also resulting in a severed length which is too short.

From the foregoing, it is apparent that there is a clear need in the art for a linear accelerator system for use with a cutoff apparatus which eliminates each of the problems discussed above.

Accordingly, it is a primary object of the invention to provide a linear accelerator system which avoids the use of moving parts for feeding the tubing, including the need for tube-engaging rollers or the like.

Another important object of the invention to provide an accelerator system of the type described above which is readily adaptable for feeding tubing of differing diameters.

A still further object of the invention is to provide an accelerator system as described above which includes a gaging system that eliminates rebounding of the tubing from a gage stop, thereby to provide highly repeatable cutting length accuracy.

Another object of the invention is to provide an accelerator system as described above which operates to brake the tubing to the proper length without the need for a gage stop.

These, and further objects of the invention will be made clear, or will become apparent from a description of the preferred embodiment described hereinafter.

DISCLOSURE OF THE INVENTION

The accelerator system of the present invention is adapted for feeding a preselected length of electrically conductive tubing or the like to a cutoff machine having a cutoff station for severing the tubing. The cutoff machine includes a press operated cutting unit provided with a pair of opposed jaws for clamping the workpiece and a reciprocating blade for cutting the tubing. The accelerator comprises electrically responsive coils having a bore therethrough through which the tubing is passed. The coils consist of an electrical conductor helically wound over a non-conductive, tubular sleeve and are operative to produce an electromagnetic field inducing an axially directed force on the tubing. A stop assembly for gaging the length of tubing to be cut includes a spring damped stop for eliminating rebound of the tubing and an electrical switch operated by the stop which produces a first control signal for disabling the accelerator. Alternatively, the accelerator may be employed as a decelerator when used in conjunction with a tube engaging length encoder, in order to feed the proper length of tubing to the cutting unit. A second electrical switch operated by the press after the severing operation has been completed causes the accelerator to feed the next length of tubing. Any of a plurality of sleeves of differing configurations may be removably mounted on the coil to slidably support tubing of differing diameters in coaxial alignment with the coil. The accelerator system may be controlled by a microprocessor controller.

BRIEF DESCRIPTION OF THE DRAWINGS

In the drawings, which form an integral part of the specification and are to be read in conjunction therewith, and in which like reference numerals are employed to designate identical parts in various views.

BEST MODE FOR CARRYING OUT THE INVENTION

Figure 1:
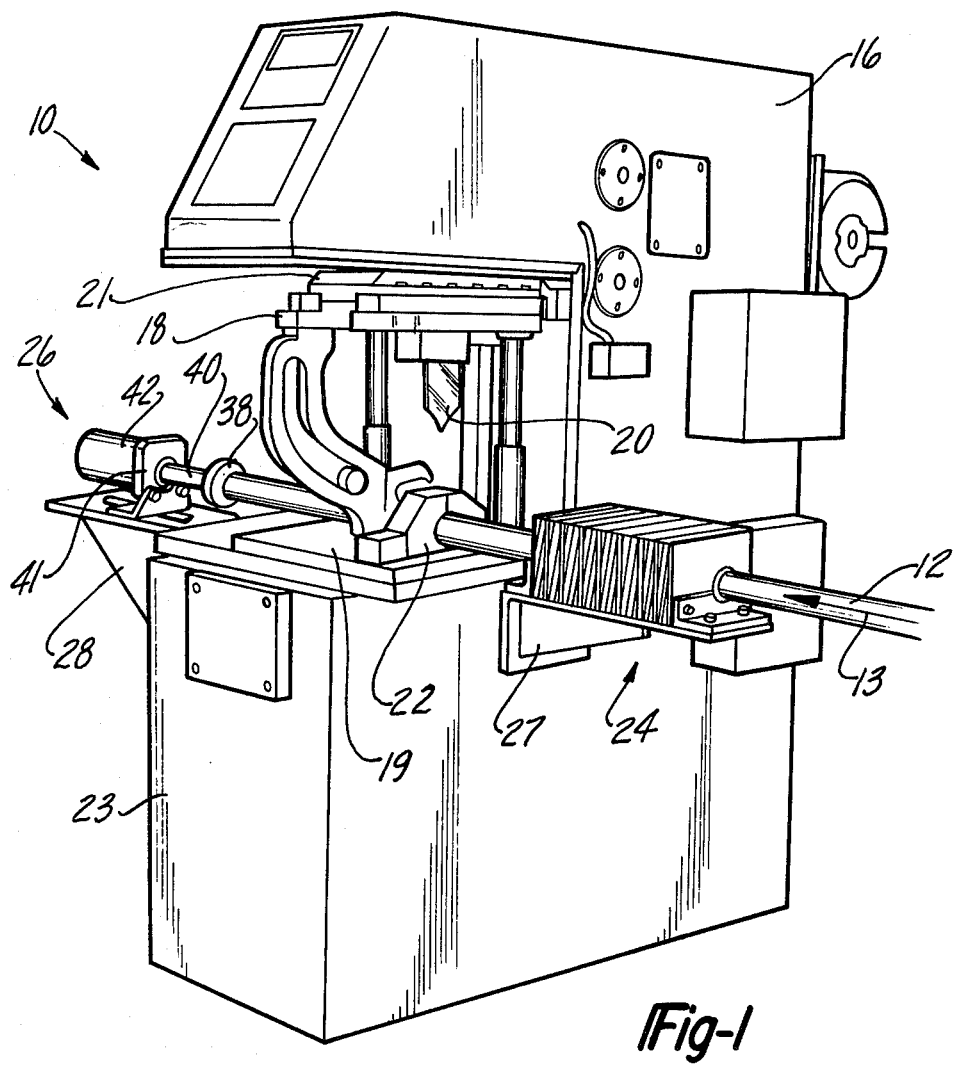
FIG. 1 is a perspective view of tube cutoff apparatus employing the linear accelerator system forming one embodiment of the present invention.
Figure 3:
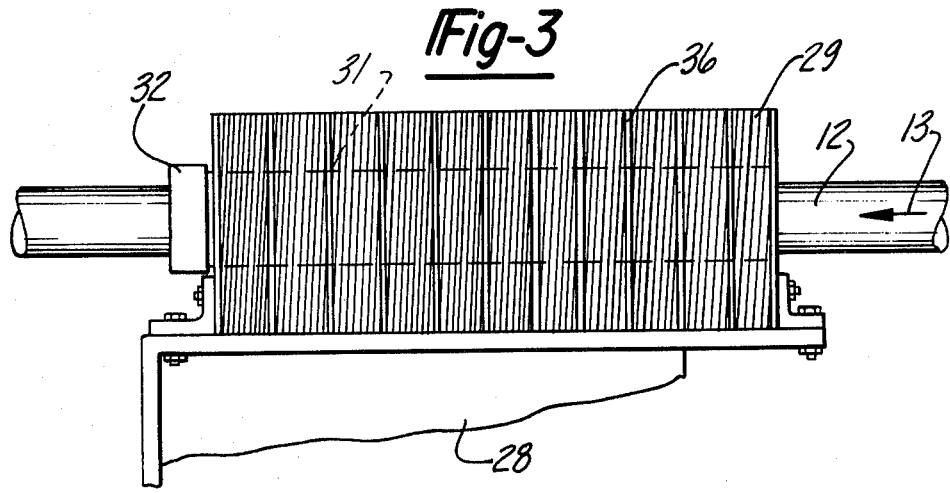
FIG. 3 is a side elevational view of the accelerator which forms a portion of the system shown in FIG. 1.
Figure 2:
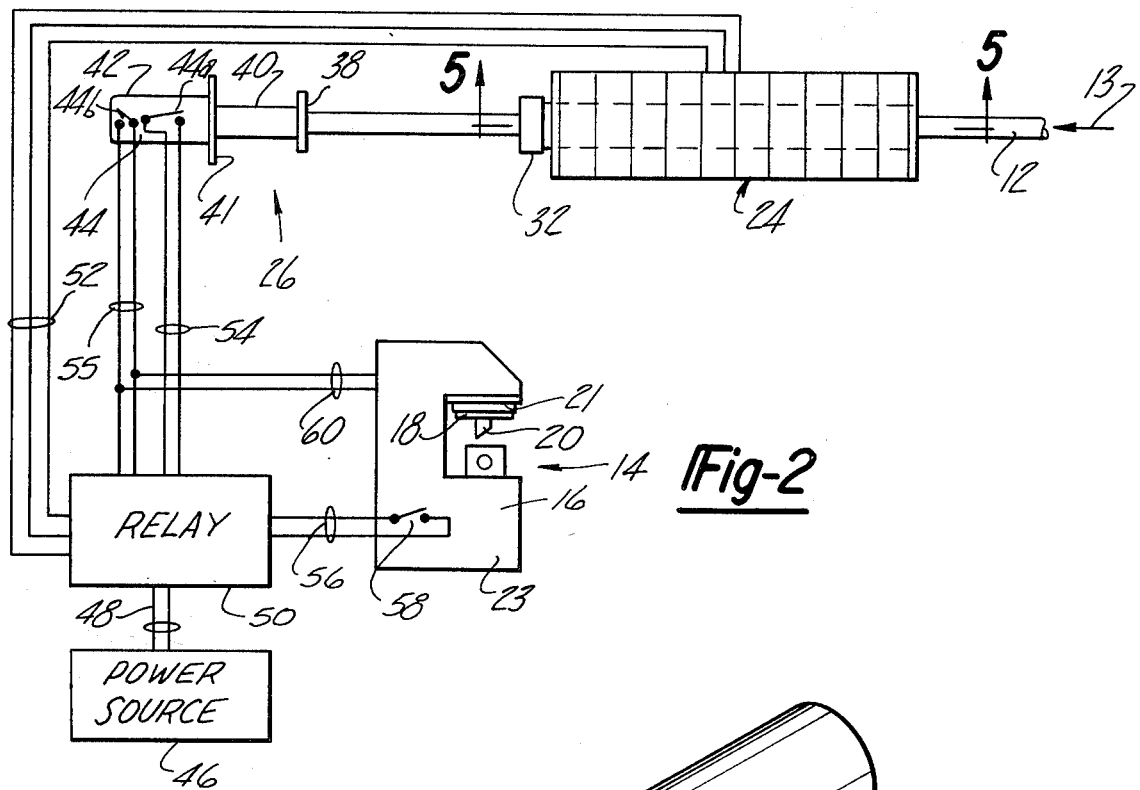
FIG. 2 is a combined diagrammatic and block diagram of a control system forming a part of the accelerator system shown in FIG. 1.
Figure 4:
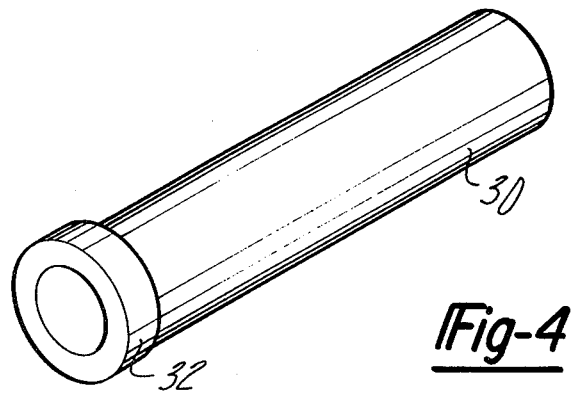
FIG. 4 is a perspective view of a removable sleeve forming a portion of the accelerator of FIG. 3.
Figure 5:
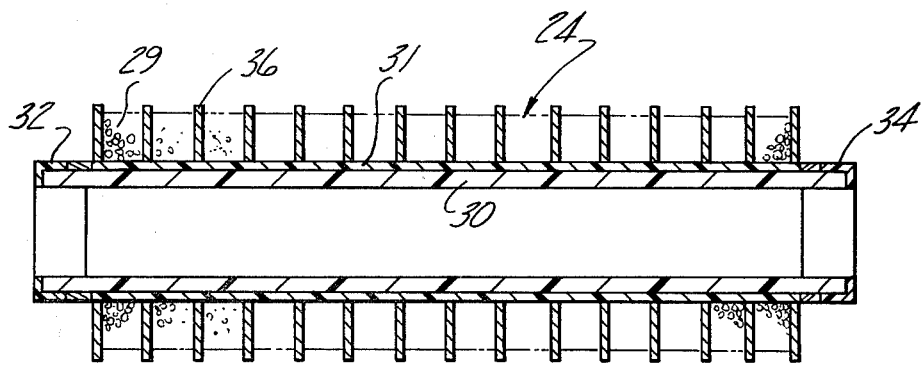
FIG. 5 is a sectional view taken along line 5—5 in FIG. 2.

Referring first to FIGS. 1-5, the present invention is broadly concerned with an accelerator system adapted for axially advancing an elongate workpiece, such as tubing 12 into a cutoff machine 10 which severs successive lengths of the tubing 12.

The cutoff machine 10 includes a press 16 having a vertically reciprocable ram 21 which operates a cutting unit, generally indicated by the numeral 14. The press 16 and associated cutting unit 14 may be similar to that disclosed in U.S. Pat. No. 4,031,792 issued June 28, 1981. Cutting unit 14 includes an upper dieshoe 18 slidably mounted on ram 21, and a lower dieshoe 19 fixedly attached to the bed 23 of press 16. A pair of horizontally reciprocable diejaws 22 operated by a cam arrangement function to clamp the tubing 12 during the severing operation. A cutoff black 20 mounted on upper dieshoe 18 reciprocates vertically upon operation of ram 21 to transversely sever the tubing 12 which is advanced through the cutting unit 14 in the direction of the arrow 13 by an accelerator system whose details will now be discussed.

The accelerator system includes an accelerator 24 mounted on the press 16 by a support 27 adjacent the feed side of cutting unit 14. Means for gaging the length of the tubing 12 to be cut include a stop or gage assembly 26 mounted on a suitable support 28 for longitudinal sliding movement on the opposite side the cutting unit 14, and in a direction parallel to the longitudinal axis of tubing 12. In this manner, the distance between the stop assembly 26 and the path of the blade 20 (which corresponds to the length of the tubing 12 to be severed) may be conveniently adjusted.

Accelerator 24 comprises a linear induction motor consisting of conductors 29 which are wound in a helical configuration and surround a hollow, cylindrical support tube 31 made of nonmagnetic material. Conductors 29 form a helical induction coil which is coupled by lead lines 52 to a later discussed control relay 50. A plurality of heat conductive, radially extending fins 36 extend into the coil winding defined by conductors 29 and dissipate heat generated by current flow therethrough. The opposite ends of the tube 31 are open, thereby defining a longitudinal bore through which the tubing 12 may pass. The inside diameter of tube 31 is marginally greater than the outide diameter of the largest tubing 12 which is to be fed to the machine 10. In the event that it is desired to feed tubing 12 of a diameter substantially less than that of tube 31, an appropriately sized sleeve 30, also made of nonmagnetic, wear resistant material, may be inserted longitudinally into the tube 31, and secured thereto by means of flange 32 which supports and maintains the sleeve 30 coaxial within tube 31. A plurality of the sleeves 30, having differing inside diameters and forming a kit may be employed in combination with the accelerator 24 thereby to accomodate tubing of differing diameters.

The stop assembly 26 includes a cylinder housing 42 which reciprocably receives a piston 40 having a stop member 38 secured to the outer extremity thereof. The cylinder 42 may be filled with hydraulic fluid and/or may include a spring member presenting a dampening resistance to the retraction of piston 40, when the end of tubing 12 engages stop member 38. In this manner, counter forces, producing "bounce" are eliminated when the tubing 12 initially engages stop member 38 so that the piston 40 retracts smoothly and uniformly until stop member 38 engages a flange 41 on housing 42.

Switching means 44 contained within housing 42 is actuated by piston 40 upon retraction of the latter. Switch 44 may be of a double switching type wherein a first set of contacts 44a is actuated by the piston 40 when the latter is retracted partially into the housing 42, and a second set of contacts 44b are closed when the piston 40 reaches its fully retracted position. The respective sets of contacts 44a, 44b are connected by corresponding lines 54 and 55 to switchable contacts of the control relay 50.

An additional switch 58 mounted on the press 16 is adapted to be actuated by operation of the ram 21 and produces an electrical signal indicating that a severing operation has been completed. Switch 58 is coupled via lines 56 to switchable contacts of control relay 50. Finally, a suitable source of electric power 46 is coupled via lines 48 to relay 50. Relay 50 may comprise any of a number of conventional electrically or electronically operated switching devices which function as a control mechanism for selectively coupling the power source 46 with lines 52, thereby energizing accelerator 24, in accordance with input signals received on lines 54, 55 and 56, as will be discussed in more detail below.

In operation, a suitable sleeve 30 corresponding to the diameter of the tubing 12 to be cut is first installed into the tube 31 and secured thereto by means of a flange 32. The feed-end of the tubing 12 is then inserted into and through the longitudinal opening in accelerator 24, in preparation for the first cut. At this point, the cutting unit 14 is in an open position, with the blade 20 raised and the diejaws 22 separated in order to receive the tubing 12 therebetween. The power source 46 is then energized by means of an off/on switch (not shown) or the like, thereby energizing lines 52 and the conductors 29. Current flow through conductors 29 produces an electromagnetic field which circumscribes the tubing 12 within accelerator 24 and induces a linearly directed, sweeping field causing the conductors 29 (the primary) to repel the tubing 12 (the secondary), thus urging the latter in the direction of the arrow 13 toward the cutting unit 14.

The field induced in successive portions of the tubing 12 continues as it slides through the sleeve 30. Eventually, the forward extremity of the tubing 12 engages stop member 38 thereby forcing piston 40 to retract. At a point of intermediate retraction, piston 40 actuates the first set of contacts 44a of switch 44 thus energizing lines 54. Relay 50 is reponsive to the signal on line 54 to reverse the direction of force applied by accelerator 24, thereby braking or slowing the feed rate of the tubing 12. The momentum of the tubing 12 temporarily exceeds the counteractive force produced by the field reversal (which builds gradually), consequently, the tubing 12 continues to retract the piston 40 until the second set of contacts 44b of switch 44 is closed. Lines 55 then cause control relay 50 to uncouple the power source 46 from lines 52. At this point, stop member 38 has engaged flange 41 and the tubing 12 has come to rest firmly against stop member 38.

Actuation of the second set of contacts 44b of switch 44 also delivers a control signal via lines 60 to the control system of the cutoff apparatus 10. Cutoff apparatus 10 is responsive to this control signal to cycle the press 16 whereupon ram 21 is cycled. Cycling of ram 21 causes dieshoe 18 to descend which closes jaws 22 around tubing 12 and forces blade 20 through the clamped tubing 12. As dieshoe 18 ascends to its starting position, diejaws 22 open and the severed length of tubing 12 may be removed either manually or with automatic handling equipment (not shown). As ram 21 returns to its raised, starting position, switch 58 is activated by ram 21 thereby producing a signal on lines 56. Control relay 50 is responsive to the signal on line 56 to couple lines at 52 with lines 48, thereby energizing the accelerator 24 to feed the next length of tubing to the cutting unit 14.

Figure 6:
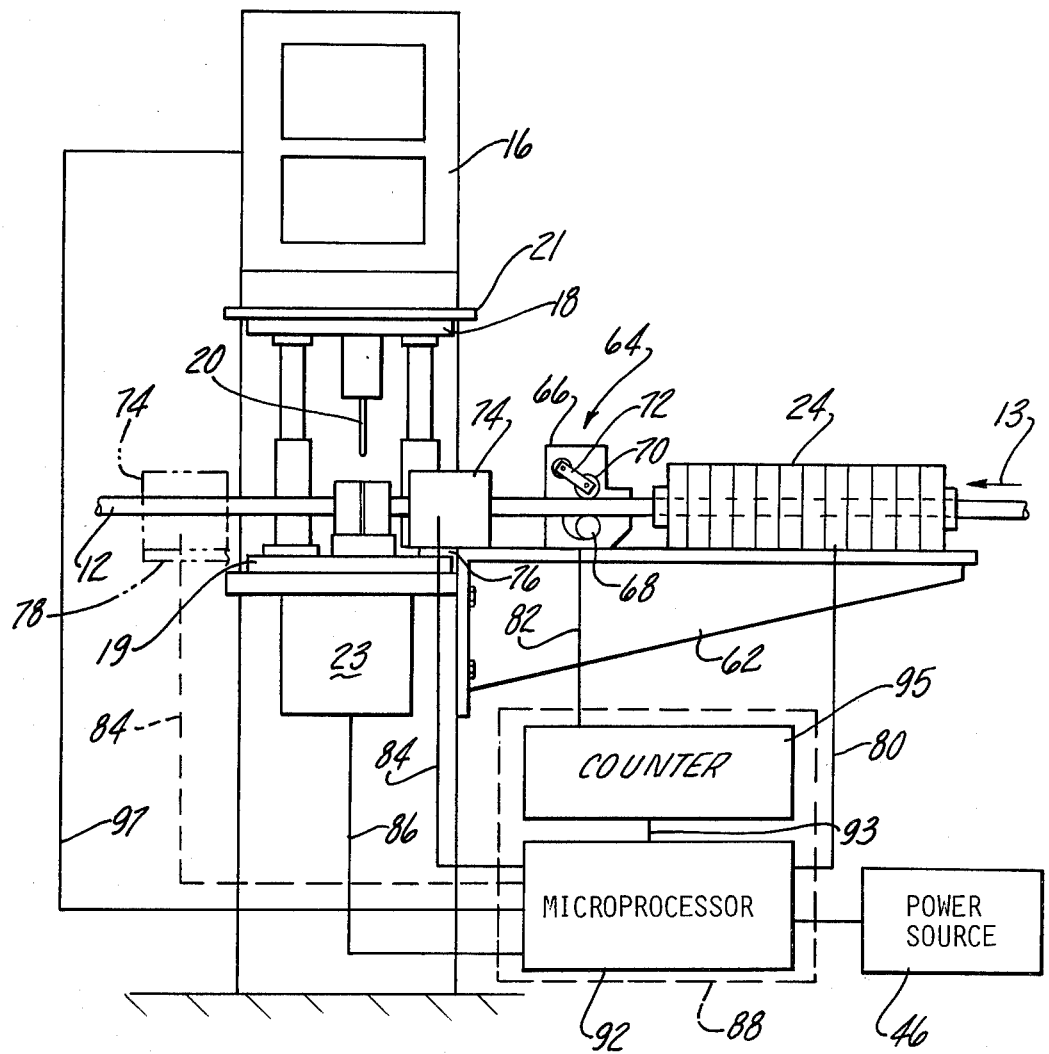
FIG. 6 is a combined block and elevational view of the preferred embodiment of the present invention.

Attention is now directed to FIG. 6 wherein an alternate embodiment of the present invention is depicted. An accelerator 24, identical to that previously described, is mounted on a support 62 secured to the bed 23 on the feed side of press 16 in order to advance the tubing 12 in a direction of the arrow 13 toward the cutting unit 14. A length encoder 64 secured to support 62 downstream of accelerator 24 senses and measures the length of tubing 12 being advanced.

Encoder 64 includes a body 66 upon which there is rotably mounted a gage wheel or roller 68 which engages one side of, and is therefore rotated by, the advance of tubing 12. A rotatable tension wheel 70 is biased into engagement with the tubing 12 by means of a spring loaded arm 72 which is pivotally connected to body 66. Biasing of tension wheel 70 ensures that slippage does not occur between tubing 12 and wheel 68. The encoder 64 includes a pulse generator (not shown) which outputs a series of pulses proportional to the length of tubing 12 which has been advanced by accelerator 24. The pulses produced by encoder 64 are delivered on line 82 to a counter 95 which accumulates a count correlatable to the length of tubing 12 which has been advanced to the cutting unit 14. The accumulated count is delivered via line 93 to a process controller, such as a microprocessor 92 which forms another portion of the control system 88.

A decelerator or retarding unit 74 is mounted by a support 76 on bed 23 downstream of the encoder 64 and accelerator 24, and preferably as close to the cutting blade 20 as possible. Retarding unit 74 is essentially identical in construction to accelerator 24 and is selectively energized by microprocessor 92 via line 84 in order to impose a braking or retarding force on tubing 12. Alternately, however, retarding unit 74 may comprise an electromechanical device which physically imposes a variable amount of friction on tubing 12. In any event, the retarding force is applied in a direction opposite to that of arrow 13. Decelerator 74 may be optionally mounted on the downstream side of cutting unit 14 as indicated in the phantom by means of a base 78 secured to bed 23.

As previously indicated, the control system 88 comprises a controller which may consist of a microprocessor 92 and a counter 95. Microprocessor 92 receives feed length data from encoder 64 and a feed enable signal on line 86 from press 16. The feed enable signal is generated by a conventional switch (not shown) operated by the cutting unit 14 when a severing operation has been completed. Microprocessor 92 is operative to selectively energize accelerator 24 and retarder 74, via lines 80 and 84 respectively, and also outputs a cycle enable signal on line 97 which enables operation of press 16.

The length of the tubing 12 which is advanced by accelerator 24 is continuously sensed by encoder 64, and counter 95 maintains a cumulative count corresponding to such length, as previously described. When counter 95 accumulates the prescribed count, the microprocessor 92 is operative to control the magnitude and direction of the force output by accelerator 24. This level of force may be controlled such that the tubing 12 is brought to a halt at precisely the point where the value stored in counter 95 corresponds to the preselected length of tubing 12 to be cut. In this manner, the advance of the tubing 12 is precisely terminated at a point to produce the pre-selected cutoff length.

As the trailing end of one tube section leaves the force field of accelerator 24, the latter is no longer able to control such tube section, however, retarder 74 applies a retarding force to the tube section thereby keeping it in contact with the following tube section in order to assure accurate cut length.

INDUSTRIAL APPLICABILITY

From the foregoing, it can be appreciated that the accelerator system of the present invention is well adapted to feeding elongate, electrically conductive workpieces of various cross-section configurations to differing types of manufacturing stations. The accelerator 24 is highly advantageous in that no moving parts are required to accelerate the tubing. Moreover, tight frictional engagement between the feed mechanism and the tubing is avoided, i.e. feed rollers are eliminated.

In view of the above, it is apparent that the accelerator system described herein not only provides for the reliable accomplishment of the objects of the invention but does so in a particularly effective and reliable manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. For use with a cutoff machine having a cutoff station for cutting off a preselected length of electrically conductive tubing or the like, apparatus for feeding said tubing linearly along the longitudinal axis thereof toward said cutoff apparatus, comprising:
    an electrically responsive accelerator for moving said tubing linearly along said longitudinal axis toward said cutoff station, said accelerator including electrical coil means adapted to be coupled with a source of electrical power for producing an electromagnetic field circumscribing said longitudinal axis, said magnetic field being operative to impose an axially directed force on said tubing urging said tubing toward said cutoff station, said accelerator including a bore therethrough coaxial with said longitudinal axis and through which said tubing may pass, said accelerator further including a sleeve slidably engaging said tubing for supporting said tubing in aligned, coaxial relationship to said bore, a support and means for removably mounted said sleeve on said support;
    means for limiting the longitudinal movement of said tubing to a distance corresponding to said preselected length, including means for sensing when said tubing has moved said distance by said accelerator; and,
    means responsive to said sensing means for controlling the operation of said accelerator.

2. For use with a cutoff machine having a cutoff station for cutting off a preselected length of electrically conductive tubing or the like, apparatus for feeding said tubing linearly along the longitudinal axis thereof toward said cutoff apparatus comprising:
    an electrically responsive accelerator for moving said tubing linearly along said longitudinal axis toward said cutoff station, said accelerator including electrical coil means adapted to be coupled with a source of electrical power for producing an electromagnetic field circumscribing said longitudinal axis, said magnetic field being responsive to impose an axially directed force on said tubing urging said tubing toward said cutoff station, said accelerator including a bore therethrough coaxial with said longitudinal axis and through which said tubing may pass, said accelerator further including:
(1) a support,
(2) a kit including a plurality of sleeve means for slidably supporting said tubing in aligned coaxial relationship to said bore and each having an inside diameter corresponding to a respectively associated tubing size, and
(3) means for removably mounted each of said sleeve means on said support;
means for limiting the longitudinal movement of said tubing to a distance corresponding to said preselected length, and means for sensing when said tubing has moved said distance by said accelerator; and,
means responsive to said sensing means for controlling the operation of said accelerator.

3. For use with a cutoff machine have a cutoff station for cutting off a preselected length of electrically conductive tubing or the like, apparatus for feeding said tubing linearly along the longitudinal axis thereof toward said cutoff apparatus, comprising:
an electrically responsive accelerator for moving said tubing linearly along said longitudinal axis toward said cutoff station, said accelerator including electric coil means adapted to be coupled with a source of electrical power for producing an electromagnetic field circumscribing said longitudinal axis, said magnetic field being operative to impose an axially directed force on said tubing urging said tubing toward said cutoff station, said accelerator including a bore therethrough coaxial with said longitudinal axis and through which said tubing may pass;
means for limiting the longitudinal movement of said tubing to a distance corresponding to said preselected length, including means for sensing when said tubing has moved said distance by said accelerator, said limiting means including a stop assembly for engaging one extremity of said tubing and means for adjusting the position of said stop assembly along said longitudinal axis whereby to permit selection of said preselected length, said stop assembly including a stop member reciprocable between a normal stand-by position and a operated position and means for damping the movement of said stop member from said stand-by position to said operated position, said sensing means including electrical switch means controlled by said stop assembly for producing an electrical signal when said stop member reaches said operated position thereof; and,
means responsive to said sensing means for controlling the operation of said accelerator.

4. The apparatus of claim 3, wherein said controlling means includes switchable circuit means responsive to said electrical signal for selectively coupling said coil means with said power source.

5. For use with a cutoff machine having a cutoff station for cutting off a preselected length of electrically conductive tubing or the like, apparatus for feeding said tubing linearly along the longitudinal axis thereof toward said cutoff apparatus, comprising:
an electrically responsive accelerator for moving said tubing linearly along said longitudinal axis toward said cutoff station, said accelerator including electric coil means adapted to be coupled with a source of electrical power for producing an electromagnetic field circumscribing said longitudinal axis, said magnetic field being operative to impose an axially directed force on said tubing urging said tubing toward said cutoff station, said accelerator including a bore therethrough coaxial with said longitudinal axis and through which said tubing may pass;
means for limiting the longitudinal movement of said tubing to a distance corresponding to said preselected length, including means for sensing when said tubing has moved said distance by said accelerator; and,
means responsive to said sensing means for controlling the operation of said accelerator, said controlling means including switchable circuit means responsive to said sensing means for reversing the coupling between said coil means and said power source whereby to reverse the direction of said electromagnetic field.

6. For use with a device having a work station performing an operation on an elongate, electrically conductive workpiece, apparatus for successively advancing preselected lengths of the workpiece along the longitudinal axis of the workpiece toward said work station, comprising:
an accelerator including means for imposing an electromagnetic field around said workpiece which accelerates said workpiece toward said work station;
means for sensing the magnitude of advancement of said workpiece, said sensing means including a roller engaging said workpiece and driven to rotate by the advance of said workpiece and means for converting the rotation of said roller to an electrical signal correlatable with the length of the workpiece which has been advanced;
a decelerator including means for imposing an electro-magnetic force field on said workpiece which decelerates said workpiece; and,
means responsive to said sensing means for controlling the operation of said accelerator and said decelerator.

7. The apparatus of claim 6 including means for biasing said workpiece and said roller into driving engagement with each other.

8. For use with a device having a work station performing an operation on an elongate, electrically conductive workpiece, apparatus for successively advancing selected lengths of the workpiece along the longitudinal axis of the workpiece toward said work station comprising:
an accelerator including means for imposing an electro magnetic field around said workpiece which accelerates said workpiece toward said work station;
a decelerator including means for imposing an electro-magnetic force field on said workpiece which decelerates said workpiece;
means for sensing the magnitude of advancement of said workpiece, said sensing means being disposed between said accelerator and said decelerator, said decelerator being disposed between said work station and said accelerator along the longitudinal axis of said workpiece; and, means responsive to said sensing means for controlling the operation of said accelerator and said decelerator.

9. For use with a device having a work station performing an operation on an elongate, electrically conductive workpiece, apparatus for successively advancing preselected lengths of the workpiece along the longitudinal axis of the workpiece toward said work station, comprising:

an accelerator including means for imposing an electromagnetic field around said workpiece which accelerates said workpiece toward said work station;

means for sensing the magnitude of advancement of said workpiece;

a decelerator including means for imposing an electro magnetic force field on said workpiece which decelerates said work piece, said decelerator and said accelerator being respectively disposed on the opposite sides of the work station along said longitudinal axis of said workpiece; and, means responsive to said sensing means for controlling the operation of said accelerator and said decelerator.

10. For use with a device having a work station performing an operation on an elongate, electrically conductive workpiece, apparatus for successively advancing preselected lengths of the workpiece along the longitudinal axis of the workpiece toward said work station, comprising:

an accelerator including means for imposing an electromagnetic field around said workpiece which accelerates said workpiece toward said work station;

means for sensing the magnitude of advancement of said workpiece;

a decelerator including means for imposing an electro-magnetic force field on said workpiece which decelerates said workpiece; and, means responsive to said sensing means for controlling the operation of said accelerator and said decelerator, said controlling means including means for sensing the completion of an operation at said work station and operative to produce an electrical control signal when the completion of an operation has been sensed, means for generating digital pulse signals corresponding to the magnitude of the advancement of said workpiece by said sensing means, and digital processing means for operating on digital pulse signals and said control signal for enabling the operation of said accelerator and said decelerator.

* * * * *